April 14, 1953 M. G. TORMO 2,634,930
QUICK-FASTENING CONDUIT CLAMP AND HANGER
Filed March 1, 1949 3 Sheets-Sheet 1
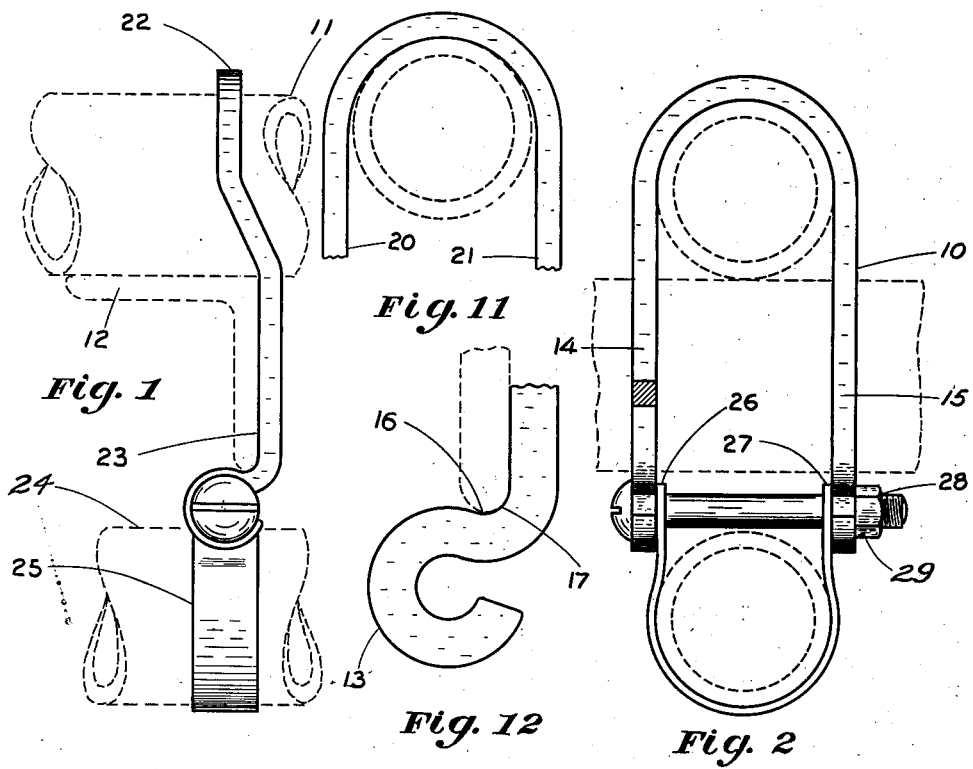
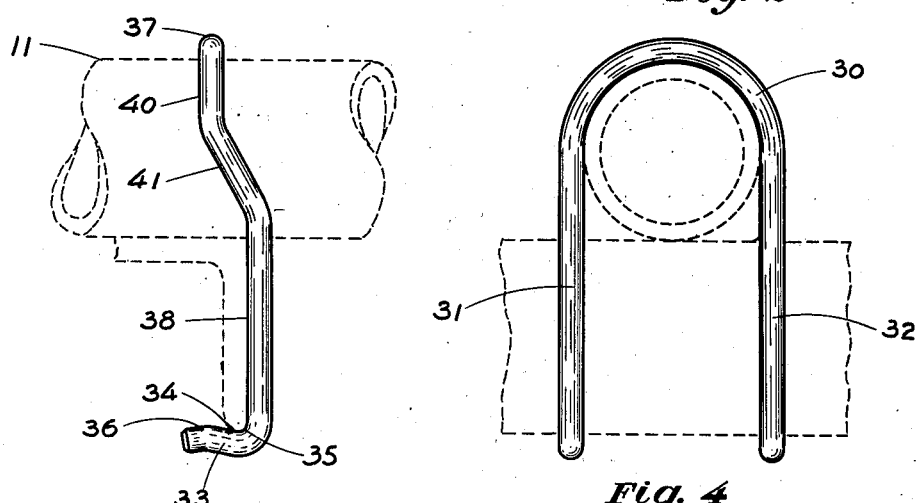
MEL G. TORMO
INVENTOR.
BY
ATTORNEY.

April 14, 1953 M. G. TORMO 2,634,930
QUICK-FASTENING CONDUIT CLAMP AND HANGER
Filed March 1, 1949 3 Sheets-Sheet 2
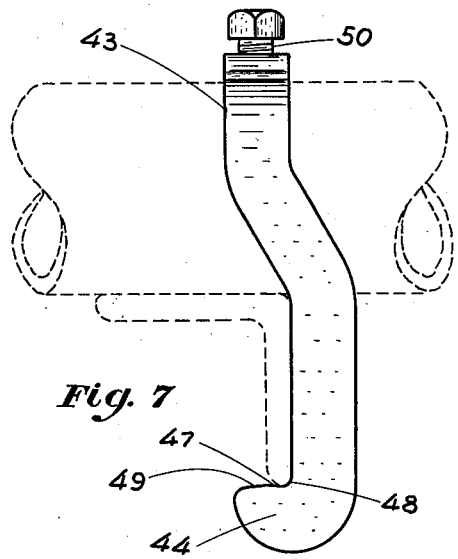
Fig. 7
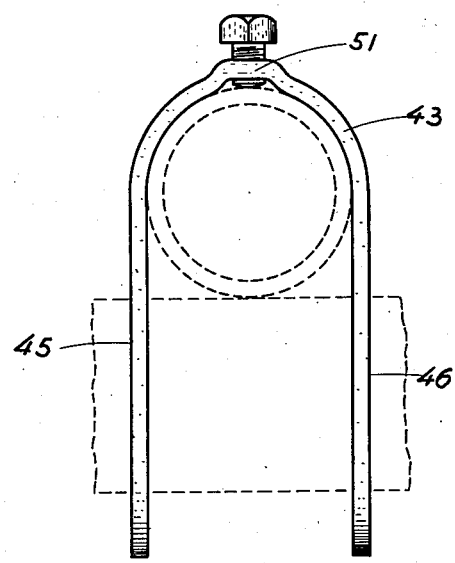
Fig. 8
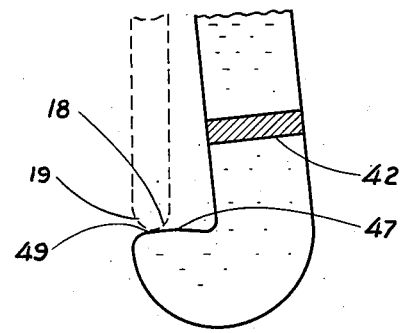
Fig. 9
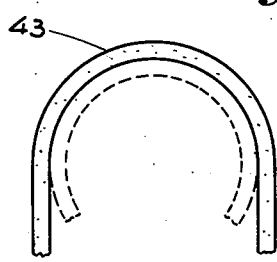
Fig. 10
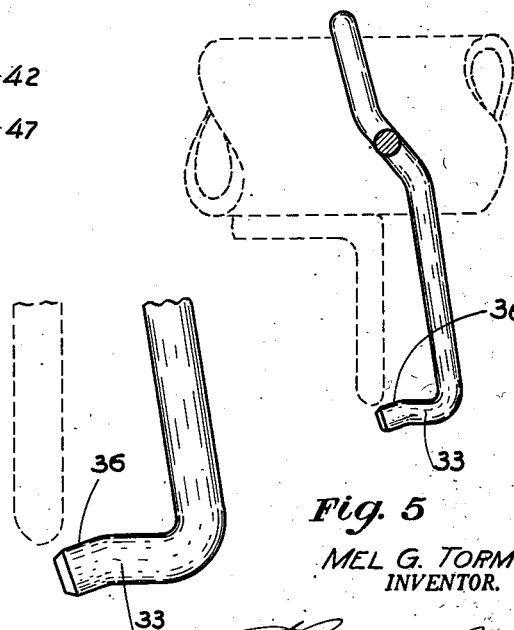
Fig. 5
Fig. 6
MEL G. TORMO
INVENTOR.
BY
ATTORNEY.

April 14, 1953     M. G. TORMO     2,634,930
QUICK-FASTENING CONDUIT CLAMP AND HANGER
Filed March 1, 1949     3 Sheets-Sheet 3
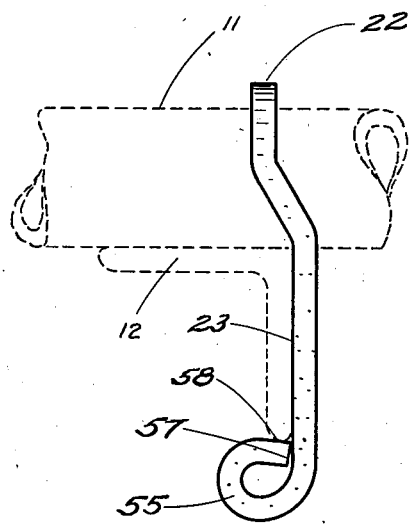
Fig. 13
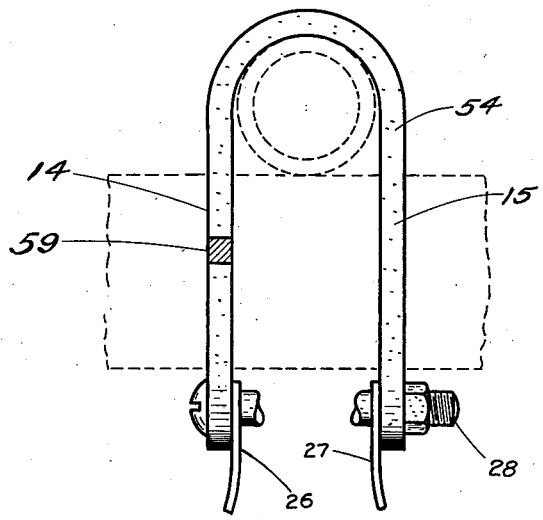
Fig. 14
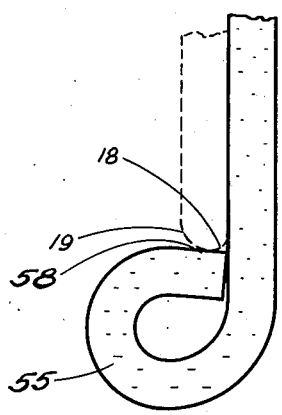
Fig. 15
MEL G. TORMO
INVENTOR.
ATTORNEY.

Patented Apr. 14, 1953

2,634,930

UNITED STATES PATENT OFFICE 2,634,930

QUICK-FASTENING CONDUIT CLAMP AND HANGER

Mel G. Tormo, Woodside, N. Y.

Application March 1, 1949, Serial No. 78,957

5 Claims. (Cl. 248—68)

This invention relates to conduit clamps and hangers, and particularly to clamps and hangers suitable for clamping conduits, used for carrying electrical wiring, against structural steel members, such as angles, or channels suspended from the ceiling, or vertically or angularly mounted and attached to the walls of a building, or other structure.

The clamping device is primarily designed for use with electrical or other types of conduits, laid in individual or multiple tiers, where one tier of conduits is directly supported on one surface of an angle, or similar structural steel member, suspended from the beams or otherwise supported in the required position. Where multiple tiers of conduits are used, the lower tiers may be supported below the angle, or other structural member.

With the vast number of wires required in a modern industrial plant, power plant, or even a large residential structure, the number of conduits required, and the overall length thereof necessitates the use of an extremely large number of clamps, hangers or other types of support.

This is also true of piping of various types, such as sprinkler lines, overhead water and steam lines, and overhead process feed-line piping utilized in industrial and chemical plants.

While a number of hangers and supports of various types are available, they are generally rather complicated and costly, and necessitate the use of a number of screws, or similar fastening elements for each support.

With overhead installations, frequently located close to the walls and ceilings, and therefore relatively inaccessible, the installation of the clamping devices consumes a great deal of time on the part of skilled and specialized mechanics, and therefore proves extremely costly. This is particularly true, when repeated trips up a ladder are necessary to fasten a hanger, or group of hangers.

An object of my invention is to provide a hanger clamp, which can be readily and rapidly attached by a relatively unskilled mechanic.

A further object is to provide a clamp, which can be produced economically of low-cost materials, without requiring accurate machine work, and which utilizes a minimum of connecting parts, or eliminates them entirely.

Another object is to provide a conduit clamp, which can be readily attached, and removed to enable the conduit to be moved, without special tools.

Another object is to provide a conduit clamp, which will provide for dimensional variations in the conduit, and will retain its clamping action, while the conduit contracts and expands due to temperature changes.

It is further an object of the invention to provide a clamp and hanger combination, which will support a plurality of tiers of conduits from one angle or other structure member.

The primary object of my invention is to provide a clamp and hanger, which can be produced at low cost, and installed by relatively unskilled labor, and in a minimum of time, without special tools.

The accompanying drawings, illustrative of several embodiments and modifications of my invention, together with the description of their construction and the method of installation thereof, will serve to clarify further objects and advantages of my invention.

In the drawings:

Fig. 1 represents a side elevation of a combination conduit clamp and hanger, showing one tier of conduits mounted on the upper leg of a structural angle, with another tier strapped below the angle.

Fig. 2 is a rear elevation of the assembled conduit clamp and hanger of Fig. 1.

Fig. 3 represents a side elevation of another embodiment of the conduit clamp, made of wire of circular cross-section.

Fig. 4 is a rear elevation of the conduit clamp of Fig. 1, assembled to the conduit and angle.

Fig. 5 is a side elevation of the clamp of Fig. 3, rotated to the released position.

Fig. 6 is an enlarged side elevation of the clamping section of the conduit clamp, in its relation to the bottom of the angle.

Fig. 7 represents a side elevation of another embodiment of the conduit clamp, made of a material of rectangular cross-section.

Fig. 8 is a rear elevation of the clamp of Fig. 7, assembled to the conduit and angle.

Fig. 9 is an enlarged side elevation of the lower clamping section of the clamp of Fig. 7, in the open position.

Fig. 10 is an enlarged rear elevation of a modification of the clamp of Figs. 7 and 8, with the set screw eliminated.

Fig. 11 represents a rear elevation of the upper section of the clamp element of Fig. 2, in relation to the conduit, with the clamp in the free position.

Fig. 12 is an enlarged side elevation of the loop of the clamp shown in Fig. 1, in relation to the bottom of the angle.

Fig. 13 represents a side elevation of a modification of the clamping unit of the combination clamp and hanger of Fig. 1, assembled to a conduit and an angle.

Fig. 14 is a rear elevation of the assembled conduit clamp and hanger of Fig. 13.

Fig. 15 is an enlarged side elevation of the loop, at the bottom of the clamp and hanger of Fig. 13.

Several distinct embodiments and modifications of the conduit clamp are shown in the drawings.

Figs. 1 and 2 show a clamp formed of square bar, with a loop formed at the lower or clamping end of each of the clamp legs, the opening in the loop receiving a bolt or screw, which supports a substantially U-shaped strap, the strap serving as a hanger or support for another tier of conduits, mounted below the angle.

The same square material may be made in the form of a single tier clamp, such as that shown in Figs. 3 and 4, with the lower loop and hanger eliminated.

Figs. 3 and 4 show a hanger clamp made of wire of circular or other suitable cross-section. The clamp is wrapped around the upper portion of the conduit, which rests on an angle, or similar structural member. The lower end of both legs of the clamp may be bent to form a clamping wedge, which grips the lower leg of the angle, in the clamping position.

Figs. 7 and 8 show another modification of the clamp of Figs. 3 and 4, the clamp being formed of flat or rectangular material. A similar wedge and ramp may be formed at the lower edge of each of the clamp legs, the portion of the wedge, adjacent the legs, gripping the lower edge of the angle in the clamping position.

Another embodiment of the clamp and hanger combination is shown in Figs. 13 and 14. This is essentially the same as the unit, shown in Figs. 1 and 2, except for the form of the loop, at the bottom of the clamp legs, and the angle of the wedge gripping the bottom of the angle.

It will be understood that the foregoing general description of the construction and method of mounting the quick-fastening conduit clamp and hanger, as well as the following detailed description thereof, are intended as explanatory of the invention and not restrictive thereof.

In the drawings, the same reference numerals designate the same parts throughout the various views, except where otherwise indicated.

In the embodiment shown in Figs. 1 and 2, the clamp comprises, essentially, a U-shaped element 10, formed of steel, of square or other suitable cross-section, the upper or head portion being fitted over a tubular conduit 11, which rests on the flat upper leg 12 of an angle, channel or other structural member, suspended from the ceiling, or otherwise supported by the structural elements of a building.

The conduit may also be vertically, or angularly mounted on an angle, or other structural member, supported by a wall, or other part of the structure.

A loop 13 may be formed at the lower end of each of the legs 14 and 15, of the clamp, the center of the loop being located a short distance beyond the inner edge of the angle leg, as indicated in Fig. 1. The portion of the material of the clamp, located between the leg and the outer circumference of the loop may be sloped upward, at a suitable angle, substantially tangent to the loop circumference, to form a sloping surface 16, with a fillet 17, slightly smaller than the corner radius 18 of the angle leg, shown in detail in Fig. 15, formed at the junction between the wedge and the clamp leg.

The sloping surface engages the junction between the corner radii 18 and 19 at the lower edge of the angle, or the forward radius 19, of the angle, thus drawing both legs of the clamp downward and gripping the conduit at the upper edge and the sides, thereby effectively clamping the conduit, when the clamp is in the closed position, shown in Fig. 1, while still allowing some relative longitudinal movement of the conduit to provide for expansion and contraction of long conduits, when subjected to temperature changes.

In the free position of the clamp, shown in Fig. 11, the distance between the legs 14 and 15 of the clamp, is made greater than the diameter of the conduit, thus providing a gap between the inner sides 20 and 21, respectively, of the clamp legs, and the outside of the conduit. This compensates for variations in conduit diameter, and for out-of-roundness of the conduit.

In the clamping position, the wedge formed at the bottom of each leg, stretches the clamp legs and draws the sides of the upper section inward, thus gripping the sides of the conduit. In assembling the loop, and ramp to the bottom of the angle, the spring action of the clamp caused by the contour of the top, and the shape of the loop, combined with the elasticity of the material, enables the clamp to be assembled to the angle without applying excessive pressure, and without special tools.

The upper section 22, of the head of the clamp, may be offset a short distance from the side 23 of the legs which engage the rear face of the angle, thus increasing the radius from the pivot point at the top, to the clamping surface of the wedge at the bottom, to effectively grip the bottom of the angle, in the clamping position, shown in Fig. 1.

In order to support another tier of conduits 24, below the angle, a strap 25, formed of flat strip steel, fibre, or a similar material, may be mounted below the angle, the upper arms 26 and 27, of the strap, being bent inward to fit between the loops of the clamp, as indicated in Fig. 2. A bolt or screw 28, may be fitted thru the openings in the loops 13, and similar openings formed in the upper arms of the strap, with a nut 29, threadably mounted on the end of the bolt, against the face of the loop, to support the strap and the lower conduit.

In another embodiment of the clamp, shown in Figs. 3 and 4, the upper end, or head of the clamp, is formed in a substantially semi-circular arc 30, to fit the circumference of the conduit 11, with two legs 31 and 32, extending downward to the bottom of the angle. An extension or toe 33 may be formed at the lower end of each leg, with the inner portion of the toe, adjacent the legs, sloped upward to form a wedge 34, with a fillet 35, formed at the junction between the wedge and the leg, the wedge engaging the junction between the corner radii 18 and 19, or the inner radius 19, at the lower edge of the angle, to draw the clamp legs downward and grip the conduit, when the clamp is in the clamping position, shown in Fig. 3. The forward portion of the toe is sloped downward to form a ramp 36, to enable the toe to be slid against the lower edge of the angle, when the clamp is moved into the gripping position.

In starting the toe of the clamp into the clamping position, the ramp, coupled with the spring action caused by the shape of the clamp, as well as the elasticity of the material, facilitates the movement of the toe of the clamp, along the angle edge, without applying heavy pressures, or utilizing special tools.

The center 37, of the head of the clamp, may be offset a short distance from the inner edge 38 of the clamp legs, adjoining the face of the angle, to increase the effective clamping radius. The upper section 40 of the head of the clamp, may be substantially parallel to the lower clamp legs, or sloped outward, and the intermediate section 41, of the clamp legs, sloped to form an offset, which facilitates the expansion of the legs, when the toe is moved into the clamping position, by hammering or other suitable means.

Fig. 5 shows the toe 33 of the clamp of Fig. 3 in the open position, with the ramp 36 out of engagement with the lower edge of the leg of the angle.

Fig. 6 is an enlarged view of the lower section of the legs of the clamp of Fig. 3, showing the relationship between the toe of the clamp and the bottom of the angle, with the clamp in the open position.

Another embodiment of the clamp, shown in Figs. 7 and 8, is formed of a steel strip of substantially rectangular cross-section 42, of Fig. 9. The head 43 of the clamp is formed in a substantially semi-circular form to fit the circumference of the conduit. An extension or toe 44, may be formed at the lower end of each of the legs 45 and 46 of the clamp, the inner edge of the upper portion of the toe being sloped upward, thus forming a wedge 47, to grip the junction between the corner radii 18 and 19 or the forward radius 19, at the lower edge of the angle. A small fillet 48 may be formed at the junction between the wedge and the edge of the leg. The open end of the toe may be sloped downward, thus forming a ramp 49, to facilitate sliding the toe of clamp against the edge of the angle. The upper section of the head 43 of the clamp may be offset from the inner side of the legs, adjacent the rear wall of the angle as indicated in Fig. 7, to intensify the grip against the conduit and the bottom of the angle.

The contour of the head of the clamp is substantially the same as that shown in Fig. 11, to provide a gap at each side, between the clamp legs and the conduit.

When the clamp is moved from the released position, shown in Fig. 9, to the closed position, shown in Fig. 7, the contour of the clamp frame, coupled with the elasticity of the material set up a spring tension in the clamp, which effectively grips the conduit and the lower edge of the angle.

In one construction, shown in Figs. 7 and 8, a set-screw 50, may be threadably fitted to an opening formed in the head of the clamp, the point of the screw gripping the outer edge of the conduit, to retain the clamp in the clamping position, the center section 51, of the head, being raised slightly to provide a greater thread area. This construction is particularly suitable for use on vertical, or angularly mounted conduits, in which a substantial portion of the weight of the conduit is supported by the clamp, the set screw serving to hold the clamp rigidly in place, against the conduit circumference.

In another embodiment of the construction, shown in Fig. 10, the set screw is eliminated, the upper portion of the clamp head, following substantially the contour of the conduit circumference.

In another modification of the combination clamp and hanger of Figs. 1 and 2, shown in Figs. 13 and 14, the U-shaped element 54, is essentially the same as that shown in Fig. 1, except for the fact that the loop 55, formed at the bottom of each of the clamp legs 14 and 15 is formed by bending the lower end of the clamp legs toward the side 23 of each leg, which adjoins the face of the angle, a short gap being left between the edge 57 of the loop, and the side of the leg.

The upper edge of the loop is sloped downward at an angle to the conduit axis to provide a wedge 58, which engages the junction between the corner radii 18 and 19, at the bottom of the angle, or the radius 19, at the forward edge of the angle leg. The loop may be formed as a smooth curve, as indicated in Fig. 13, or an angular ramp may be formed at the upper portion of the loop to facilitate pressing the loop against the lower edge of the angle.

The method of forming the loop, shown in Fig. 13, and the form and location of the wedge portion of the loop, introduce a cantilever, which sharply increases the spring action of the clamp against the lower edge of the angle, over that of the loop in Fig. 1. This allows the use of a ramp having a sharper angle, and greater depth, than that of Fig. 1, and still permits the assembly of the loop against the angle leg, without requiring excessive pressure, or special tools.

The clamp and hanger unit may be made of a material of square section 59, or other suitable cross-section, similar to that shown in Fig. 1 and 2.

The upper section 22 of the head of the clamp may be offset a short distance from the side 23, of the lower legs of the clamp, in the same manner as that shown in Fig. 1, and hereinbefore described.

In order to support an additional tier of conduits below the angle, a substantially U-shaped strap may be mounted below the angle, the upper arms 26 and 27, of the strap, being fitted between the inner sides of the loops of the clamp, in the same manner as that shown in Fig. 2, and hereinbefore described.

In all other respects, the clamp and hanger of Figs. 13 and 14 are essentially the same as the one shown in Figs. 1 and 2, and hereinbefore described.

While the combination clamps and hangers, shown in Figs. 13 and 14 are made of a material of square cross-section, a circular, rectangular, or other cross-section may be substituted therefor, should special conditions render it preferable.

Similarly, a loop 13, such as that shown at the bottom of the legs in the clamp shown in Fig. 1, may be added at the bottom of each leg, in the clamps shown in Figs. 3 and 7, to form a combination clamp and hanger, similar to that shown in Figs. 1 and 2.

The form and contour of the ramp and wedge of the clamps, shown in Figs. 6 and 9, may be varied considerably, depending upon the size of the conduit, the cross-section of the material used, the tension and grip required, and the method used in moving the clamp from the released to the clamping position.

The depth of the wedge from the bottom of the fillet to the top of the toe may be increased or reduced considerably, without seriously affecting the clamping action of the clamp, due to spring action caused by the elasticity of the material, of which the clamps are made, coupled with the form and contour of the clamp head.

It will be apparent to those skilled in the art that my present invention is not limited to the specific details described herein and shown in the drawings, and that various modifications are possible in carrying out the invention, without departing from the spirit and scope of the appended claims.

What I claim as new and desire to secure by Letters Patent is:

1. A combination clamp and hanger for supporting a plurality of substantially tubular bodies against a structural member, comprising a structural member having a flat face and a projecting leg substantially perpendicular to the flat face, a plurality of tubular bodies, one of said tubular bodies resting on the flat face of said structural member, a substantially U-shaped element, fitted over a portion of the outer circumference of one of the tubular bodies, the sides of said element straddling the tubular body, the lower end of each of the sides of said element being formed into a loop, the upper portion of the loop being sloped to grip the lower edge of the projecting leg of the structural member, means supporting an additional tubular body below the structural member, and means for attaching said support means to the loop formed in the clamping element.

2. A clamp for supporting a substantially tubular object against a structural angle, comprising a structural angle having a flat face and a projecting leg perpendicular to the flat face, a tubular object mounted against the flat face of said angle, a substantially U-shaped element, made of a material of substantially square cross-section, fitted over a portion of the outer circumference of the object, the sides of said element straddling the object, the lower end of each of the sides of said element, being formed into a loop, the upper portion of the loop being sloped, being so formed as to grip the edge of the projecting leg of the angle, and clamp the object against the angle, an auxiliary tubular object mounted below the structural angle, a formed strap having openings therethrough in substantial alignment with the U-shaped element loops, fitted around said auxiliary tubular object, means fitted through the loops in the sides of the U-shaped element passing through the strap opening to support the strap and the auxiliary conduit.

3. A clamp for supporting a conduit against a structural angle, comprising a structural angle having a flat face and a projecting leg perpendicular to the flat face, a tubular conduit mounted against the flat face of said angle, a substantially U-shaped element, made of a material of substantially square cross-section, fitted over a portion of the outer circumference of said conduit, the sides of said element straddling the conduit, the lower end of each of the sides of said element being formed into a loop, the upper portion of said loop being so sloped as to grip the lower edge of the projecting leg of the angle, the cam action of the sloping portion of the loop combining with the spring action of the element to secure the conduit against the flat face of the angle.

4. A clamp for supporting a conduit against a structural angle, comprising a structural angle having a flat face and a projecting leg perpendicular to the flat face, a tubular conduit mounted against the flat face of said angle, a substantially U-shaped element, made of a material of substantially circular cross-section fitted over a portion of the outer circumference of the conduit, the sides of said element straddling the conduit, an extension formed integral with one end of each of the sides of said element, the semi-circular portion of said element being offset from the sides, to increase the effective radius of the extension, the edge of the extension, engaging the lower edge of the projecting angle leg, being formed into a curved loop, the spring action of the element causing the loop to grip the projecting angle leg and clamp the conduit against the angle.

5. A clamp for supporting a conduit against a structural angle, comprising a structural angle, having a flat face and a projecting leg perpendicular to the flat face, a tubular conduit mounted against the flat face of said angle, a substantially U-shaped element, made of a material of substantially square cross-section, fitted over a portion of the outer circumference of the conduit, the sides of said element straddling the conduit, an extension formed integral with one end of each of the sides of said element, the semi-circular portion of said element being offset from the sides, to increase the effective radius of the extension, the bottom of each of the extensions being formed into a curved loop, the upper portion of the loop being sloped, the spring action of the element and the loop formed therein, causing the sloping surface to grip the edge of the projecting angle leg and clamp the conduit against the face of the angle.

MEL G. TORMO.

References Cited in the file of this patent

UNITED STATES PATENTS

| Number | Name | Date |
|---|---|---|
| 499,549 | Hunter et al. | June 13, 1893 |
| 705,984 | Wellington | July 29, 1902 |
| 901,179 | Kunkel | Oct. 13, 1908 |
| 1,063,566 | McFeaters | June 3, 1913 |
| 1,445,410 | Palmer-Jones | Feb. 13, 1923 |
| 1,619,591 | Voellmecke | Mar. 1, 1927 |
| 1,818,659 | Tournier | Aug. 11, 1931 |
| 2,385,209 | Joyce | Sept. 18, 1945 |

FOREIGN PATENTS

| Number | Country | Date |
|---|---|---|
| 584,183 | Germany | Mar. 11, 1930 |
| 601,108 | France | Feb. 23, 1926 |